United States Patent [19]

Watanabe et al.

[11] Patent Number: 4,896,179
[45] Date of Patent: Jan. 23, 1990

[54] LENS DRIVE APPARATUS FOR CAMERA

[75] Inventors: Youji Watanabe, Sagamihara; Junichi Itoh, Hachioji, both of Japan

[73] Assignee: Olympus Optical Co., Ltd., Tokyo, Japan

[21] Appl. No.: 295,822

[22] Filed: Jan. 11, 1989

[30] Foreign Application Priority Data

Jan. 14, 1988 [JP] Japan .................................. 63-005746

[51] Int. Cl.$^4$ ............................................... G03B 3/10
[52] U.S. Cl. ................................................... 354/195.1
[58] Field of Search ........................................ 354/195.1

[56] References Cited

FOREIGN PATENT DOCUMENTS 3801360 7/1988 Fed. Rep. of Germany .
176415 11/1985 Japan .
177118  7/1988 Japan .

*Primary Examiner*—Michael L. Gellner
*Attorney, Agent, or Firm*—Louis Weinstein

[57] ABSTRACT

A lens drive apparatus includes a manual operating member. A pulse generator produces pulses as the operating member is moved. Based on a phase shift between the pulses, the speed with which and the direction in which the operating member is moved are detected. Control circuitry delivers a drive signal to a lens driving motor in accordance with the speed of movement signal and the direction of movement signal. A relationship between the speed of movement signal and the drive signal which prevails in the control circuitry can be modified, allowing a high or low level of the drive output to the motor to be selected with respect to the speed of movement and also allowing the speed with which and the direction in which the motor is driven, thus enabling the control circuitry to control the motor.

18 Claims, 13 Drawing Sheets

4,896,179

LENS DRIVE APPARATUS FOR CAMERA

FIELD OF THE INVENTION AND RELATED ART STATEMENT

The invention relates to a lens drive apparatus for a camera, and more particularly, to such apparatus in which a movement of a lens required for distance adjustment or focussing operation of a taking lens is performed by a motor which is driven in response to a manual operation of an operating member.

A conventional mechanism for causing movement of a lens which has been utilized in a photographic camera, an interchangeable lens or a zoom lens has been principally a purely mechanical lens drive mechanism including an operating ring such as a distance ring or a zoom ring which is mounted on a lens barrel which may be manually turned by a photographer to transmit its rotation to its coupled helicoid frame to cause a translation of a lens frame in the direction of an optical axis. Recently, a so-called power focus unit or a power zoom unit is offered on the market including a motor for driving a lens and a pair of pushbutton switches, the open or closed condition of which is detected to drive the motor which in turn causes a translation of the lens.

The present applicant has previously proposed a power focus unit in Japanese Laid-Open Patent Application No. 177,118/1978 or counterparts in the United States of Ser. No. 143,818 or in West Germany of Laid-Open Application No. 3,801,360 in which the operating member comprises a rotary member capable of rotation through multiple turns, and in which the speed of a lens drive motor is controlled in accordance with the speed of rotation of the rotary member.

However, in a power focus unit as mentioned above which has been proposed by the present applicant as well as in a purely mechanical lens drive mechanism, a fixed relationship is established between the speed of turning the distance ring and the rate of movement of the focus, and the relationship once established could not have been freely chosen. However, it will be appreciated that such relationship differs from interchangeable lens to lens in a single lens reflex camera. In addition, a focal plane undergoes through a substantial distance for a slight stroke of rotation in a certain lens while the focal plane remains substantially immovable in another lens. Finally, if a single lens is used throughout, it is desired to achieve an in-focus condition exactly in one instance and it is desired to achieve an in-focus condition very rapidly in another instance, depending on an object being photographed.

As another factor, the relationship between the direction in which the distance ring or zoom ring is turned and the direction of translation of the lens may present difficulty in use depending on a photographic composition intended or posture assumed or the preference of a photographer. Thus, a certain photographer may take it for granted that the taking lens should be fed forward in response to a clockwise rotation of the distance ring or zoom ring while another photographer may find it amenable to use when the opposite is true.

OBJECT AND SUMMARY OF THE INVENTION

It is a principal object of the invention to overcome the above difficulties.

It is another object of the invention to provide a lens drive apparatus for camera a including improved presetting means which allows a desired relationship between the speed with which an operating member is operated and a rate of movement of the lens to be chosen.

It is a further object of the invention to provide a lens drive apparatus in which the presetting means allows the relationship between the direction in which the operating member is operated and the direction in which the lens moves to be freely chosen, thus enabling the lens to be fed either forward or rearward according to the preference of each individual photographer as the operating member is manually operated. dr

DETAILED DESCRIPTION OF PREFERRED EMBODIMENTS

Figure 1:
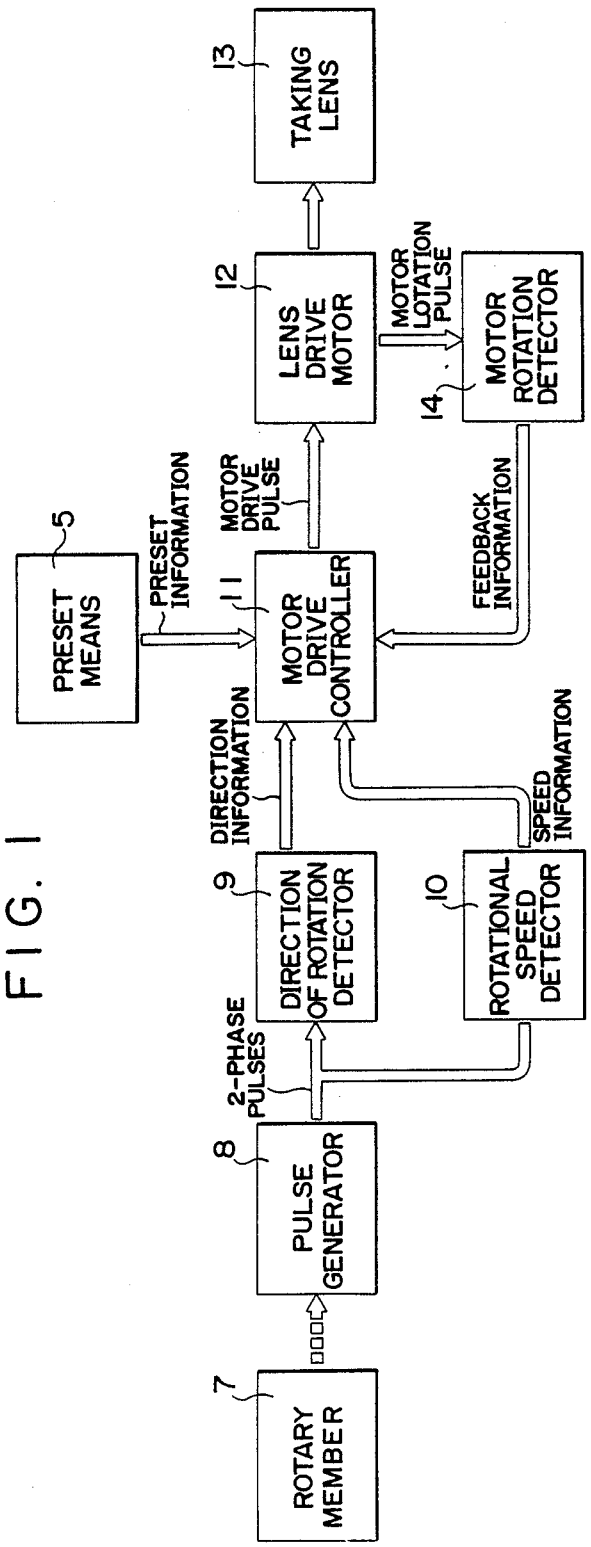
FIG. 1 is a block diagram of a power focus apparatus according to one embodiment of the invention.
Figure 2:
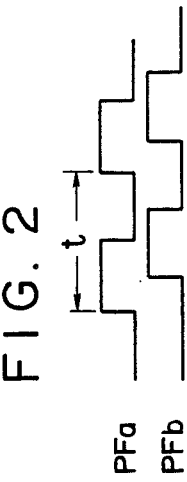
FIG. 2 graphically shows waveforms of to phase pulse signals shown in FIG. 1.

FIG. 1 is a block diagram generally illustrating a power focus apparatus according to one embodiment of the invention. A rotary operating member 7 is mounted on either a camera body or on a part of an interchangeable lens barrel so as to be rotatable. In response to the rotation of the member 7, a pulse generator 8 produces pulse signals PFa and PFb (see FIG. 2) having two phases which are different from each other. These two phase pulses are fed to a direction of rotation detector 9 and a rotational speed detector 10. In response to the relative phases of these pulses, the detector 9 detects the direction of rotation of the rotary member 7 on the basis of the phases of the pulses while the detector 10 detects the rotational speed of the rotary member 7 in accordance with the frequency, the pulse width or the duty cycle of the two phase pulses. Such information representing the direction of rotation and the rotational speed as supplied by the detectors 9 and 10 are supplied to a motor drive control circuit 11. The control circuit 11 delivers a motor drive pulse to a lens drive motor 12 in accordance with such information representing the direction of rotation and the rotational speed in conjunction with selected information which is arbitrarily established by a photographer by means of preset means 15 or information representing a focal length of a lens, thus determining the voltage applied to or the frequency fed or the duty cycle of a drive current to the motor 12. These parameters are suitably chosen depending on the design of a motor used. Where a duty cycle control is employed, the speed of movement of a taking lens 13 is determined in accordance with the duty cycle. Pulses representing the rotation of the motor 12 are fed to a detector 14 which detects the amount of rotation of the motor for feedback to the motor drive control circuit 11.

Figure 3:
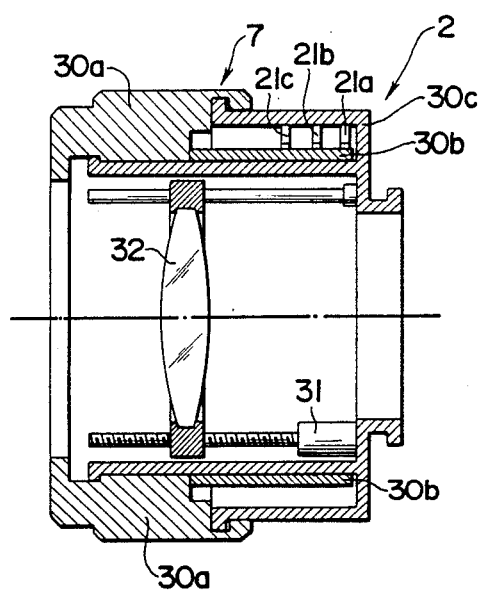
FIG. 3 is a cross section of a rotary operating member and a pulse generator mounted on a lens barrel in the above embodiment.
Figure 4:
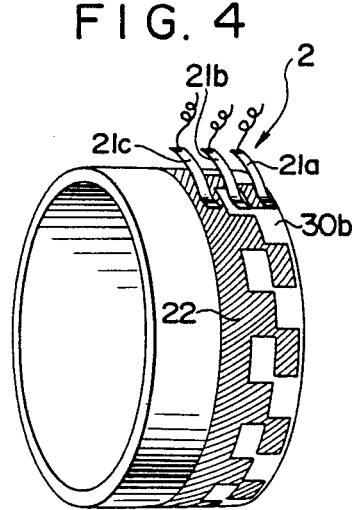
FIG. 4 is a perspective view of an encoder switch which forms the pulse generator shown in FIG. 3.

The rotary member 7 and the pulse generator 2 used in the described embodiment may be mounted on a lens barrel, for example, as illustrated in FIG. 3. Specifically, the rotary member 7 comprises an operating member 30a which is rotatably mounted on a lens barrel, and a rotary sleeve 30b which is integral with the member 30a. As shown in FIG. 4, a conductive pattern 22 is applied around the sleeve 30b, and conductive contacts 21a to 21c, which are fixedly mounted on a stationary sleeve 30c, are urged for abutment against the pattern 22. The contacts 21a and 21b can be brought into conducting or non-conducting relationship with the contact 21c as the sleeve 30b rotates. There is a phase difference of 90° between the timings when the conductive contacts 21a and 21b conducts with the conductive contact 21c, respectively. In this manner, two phases of electrical signals are obtained, and by determining the manner of phase advance of these signals, the direction of rotation of the rotary member 30a may be detected. The period between conduction or non-conduction allows the rotational speed of the rotary member 30a to be detected. In the power focus apparatus of the embodiment, data representing the direction of rotation and the rotational speed are used to determine the direction in which and the speed with which a lens driving DC motor 31, disposed within the lens barrel, is driven, thus translating a focus adjusting lens 32 in the direction of its optical axis. The motor 31 may comprise an ultrasonic motor which rotates in response to a travelling oscillating wave without requiring any change in the fundamental arrangement.

Figure 5:
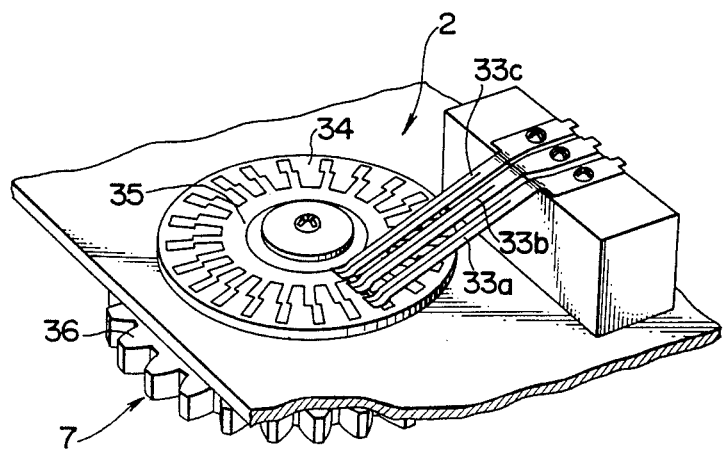
FIG. 5 is a perspective view of a rotary operating member and a pulse generator for use in the described embodiment which are mounted on a camera body.

FIG. 5 shows another form of rotary member 7 and pulse generator 2, which may be mounted on a camera body. When a rotary operating member 36 which is mounted on a camera body is turned, a rotatable plate 34 rotates, whereby an electrically conductive pattern 35 applied thereto allows a conduction to be established between either conductive contact 33a or 33b and another conductive contact 33c, with a phase difference of 90° therebetween. The motor control remains the same as in the previous embodiment in which the operating member is mounted on the lens barrel. It will be seen that the pulse generator 2 comprises an encoder switch if the rotary member 7 and the pulse generator 2 are mounted on either the lens barrel or the camera body. In the description to follow, it is assumed that the rotary member 7 and the pulse generator 2 are mounted on the lens barrel.

Figure 6:
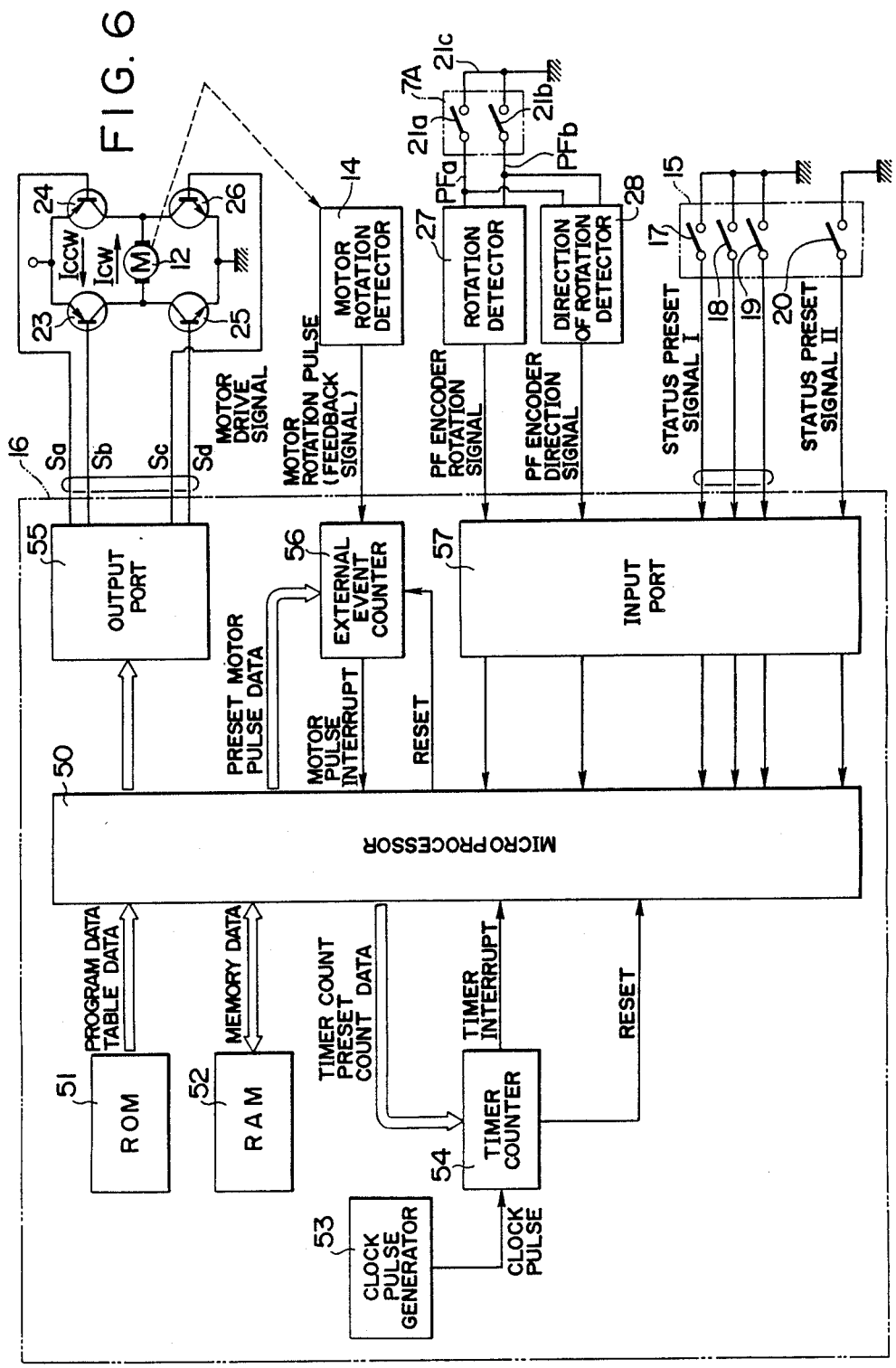
FIGS. 6 and 7 illustrate the arrangement of an electrical circuit of the power focus apparatus of the above embodiment, FIG. 6 illustrating an arrangement in which a lens is driven by a DC motor and FIG. 7 illustrating an arrangement in which a lens is driven by an ultrasonic motor.

Referring to FIGS. 6 to 11, a specific arrangement of the invention will now be described. In FIG. 6, there is shown an operating unit 7A including a rotary operating member 7 and having conductive contacts 21a, 21b and 21c which function in the manner mentioned above and which are turned on and off in response to a turning operation. The resulting signals are fed as two phase pulse signals PFa and PFb (see FIG. 9) to a rotation detector 27 and a direction of operation detector 28, which deliver a PF encoder rotation signal representing the rotational speed of the rotary member 30a and a PF encoder direction signal representing the direction in which the rotary member 30a has been turned, respectively.

Figure 9:
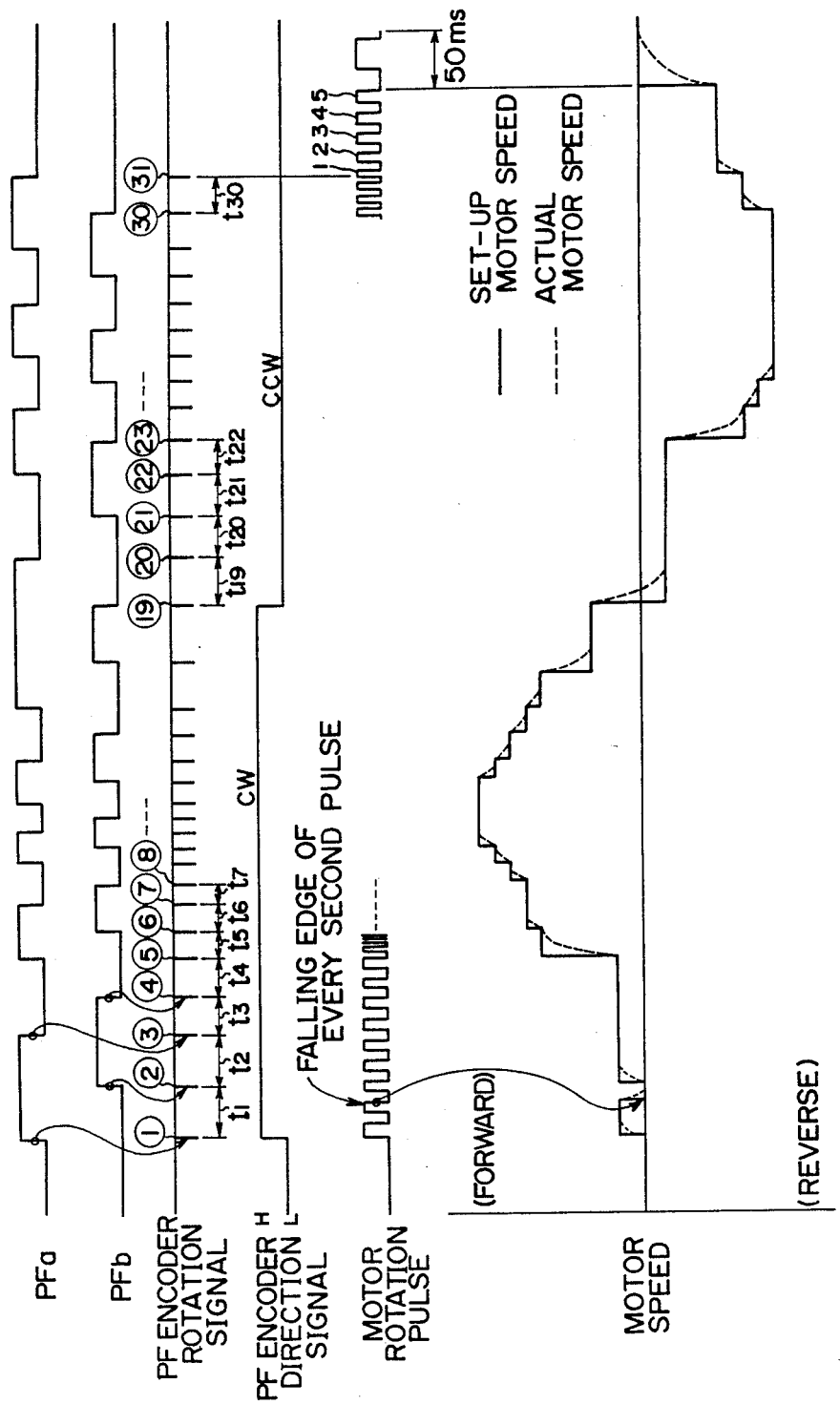
FIG. 9 graphically shows waveforms of various signals appearing in the circuit shown in FIG. 6.

Referring to FIG. 9, the PF encoder rotation signal has a falling edge in response to a change in the status of either one of the two phase pulse signals PFa and PFb. On the other hand, the PF encoder direction signal assumes an "H" level when the rotary member 30a is operated clockwise (CW), and assumes an "L" level when it is operated counterclockwise (CCW). Both tee PF encoder rotation and direction signals are directly inputted to CPU 16.

Returning to FIG. 6, the lens driving DC motor 12 is driven by four transistors 23 to 26, which are activated by motor drive signals Sa, Sb, Sc and Sd supplied from CPU 16. The motor operation is indicated by Table 1 shown below, which represents a truth table for the motor drive signals Sa, Sb, Sc and Sd. Specifically, when CPU 16 delivers a forward rotation signal (Sa="H", Sb="L", Sc="H" and Sd="L"), the transistors 23 and 26 are turned on to pass a drive current Icw through the motor 12, thus causing it to rotate clockwise.

TABLE 1

| Function | Signal | | | |
|---|---|---|---|---|
| | Sa | Sb | Sc | Sd |
| Forward rotation | H | L | H | L |
| Reverse rotation | L | H | L | H |
| Stop | H | H | L | L |
| Braking | H | H | H | H |

When CPU 16 delivers a reverse rotation signal (Sa="L", Sb="H", Sc="L" and Sd="H"), the transistors 24 and 25 are turned on to pass a drive current Iccw through the motor 12, causing it to rotate counterclockwise. When a stop signal (Sa="H", Sb="H", Sc="L" and Sd="L") is supplied, all the transistors are turned off, whereby the motor 12 ceases to operate. When a braking signal (Sa="H", Sb="H", Sc="H" and Sd="H"), only the transistors 25 and 26 are turned on to short-circuit the motor 12, thus applying a braking action thereto. The speed control of the motor 12 takes place by repeatedly alternating between the drive and the stop with a given period, with the ratio of the time interval for the drive and the stop being changed to produce a varying current flow through the motor, thus achieving a pulse drive of the motor. When one period is fixed to the order of 2 ms, a duty cycle, or a ratio of drive period of 50%, for example, results in a rotational speed of the motor which will be reduced to 50% of the full speed. In the present embodiment, the amount of rotation of the motor 12 is detected by the detector 14, which feeds a motor rotation pulse back to CPU 16.

Preset means 15 comprises a plurality of lens drive speed changeover switches 17 to 19 which are operated by a preset member which is in turn mounted on a lens barrel, and a lens drive direction switch 20.

Figure 10:
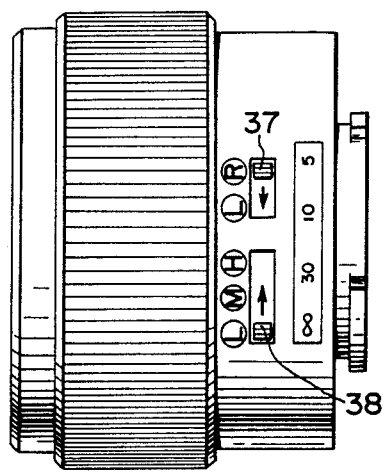
FIG. 10 is a plan view of presetting means used in the power focus apparatus of the above embodiment which is disposed in a lens barrel.

Referring to FIG. 10, the switches 17 to 19 can be switched by bringing an operating knob 38 mounted on a lens barrel to either position Ⓛ, Ⓜ, and Ⓗ, respectively. Thus, the switch 17 is turned on at position Ⓛ while the remaining switches 18 and 19 remain off. At position Ⓜ, only the switch 18 is turned on, and at position Ⓗ, only the switch 19 is turned on. The purpose of these switches 17 to 19 is to allow the relationship between the rotational speed of the rotary member 30a and the lens drive speed to be selectively changed according to a preference of a photographer depending on the position which the operating knob 38 assumes.

On the other hand, the lens drive direction switch 20 is operated by another operating knob 37 also mounted on a lens barrel as shown in FIG. 10. It is turned on when the knob assumes position Ⓛ and is turned off at position Ⓡ. The purpose of the switch 20 is to allow the relationship between the direction in which the rotary member 30a is turned and the direction in which the lens is driven to be chosen according to a preference of a photographer.

CPU 16 controls the power focussing operation. It comprises a microprocessor 50 indicated by a solid line rectangle shown in FIG. 6 which performs an arithmetic operation, ROM 51 which stores programs and table data, a temporary storage RAM 52, a timer counter 54 which performs a time counting operation, a clock pulse generator 53 which supplies a clock to the counter 54, an output port 55 through which a drive signal to the motor 12 is delivered, an external event counter 56 which counts an external pulse, and an input port 57 which receives external signals. The clock pulse generator 53 produces clock pulses which are developed every 100 μS and which are counted by the counter 54 until the number of pulses counted coincide with a preset count previously established within the microprocessor 50, whereupon a timer interrupt signal is delivered to the microprocessor 50. The external event counter 56 counts the number of motor rotation pulses delivered from the detector 14 until such number coincides with a preset count established within the microprocessor 50, whereupon a motor pulse interrupt signal is delivered to the microprocessor 50.

Figure 7:
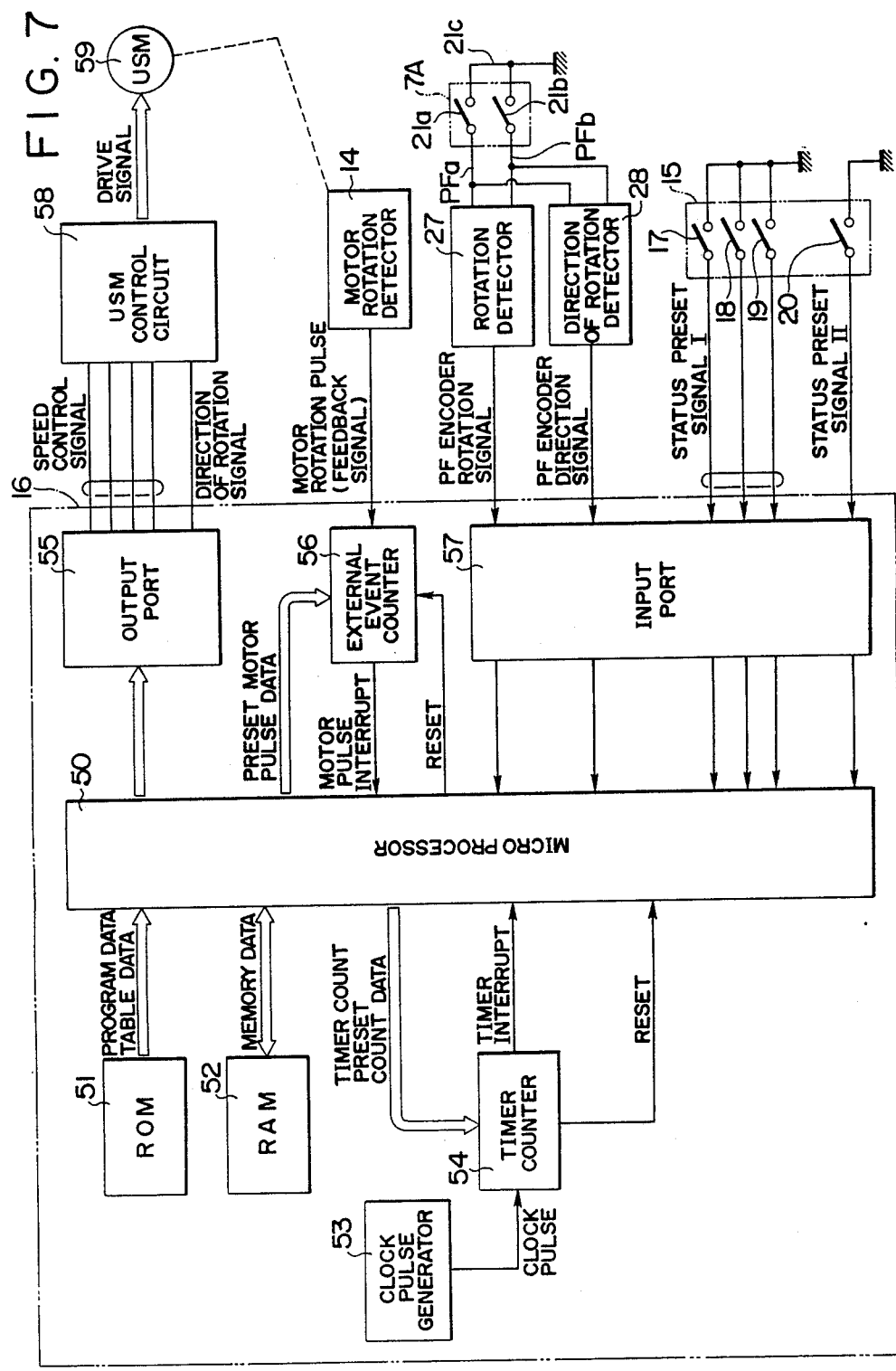

FIG. 7 shows a similar block diagram which is employed when an ultrasonic motor (hereafter abbreviated as USM) is used as the lens drive motor. The arrangement of FIG. 7 differs from that of FIG. 6 only the respect of a control circuit 58 associated with USM 59 and its control signals. In other respects, the arrangement is similar to FIG. 6. CPU 16 delivers a speed control signal which is used to choose a rotational speed of USM 59 and a direction of rotation signal (which is "H" for CW and which is "L" for CCW) for determining the direction of rotation to the USM control circuit 58.

Figure 8:
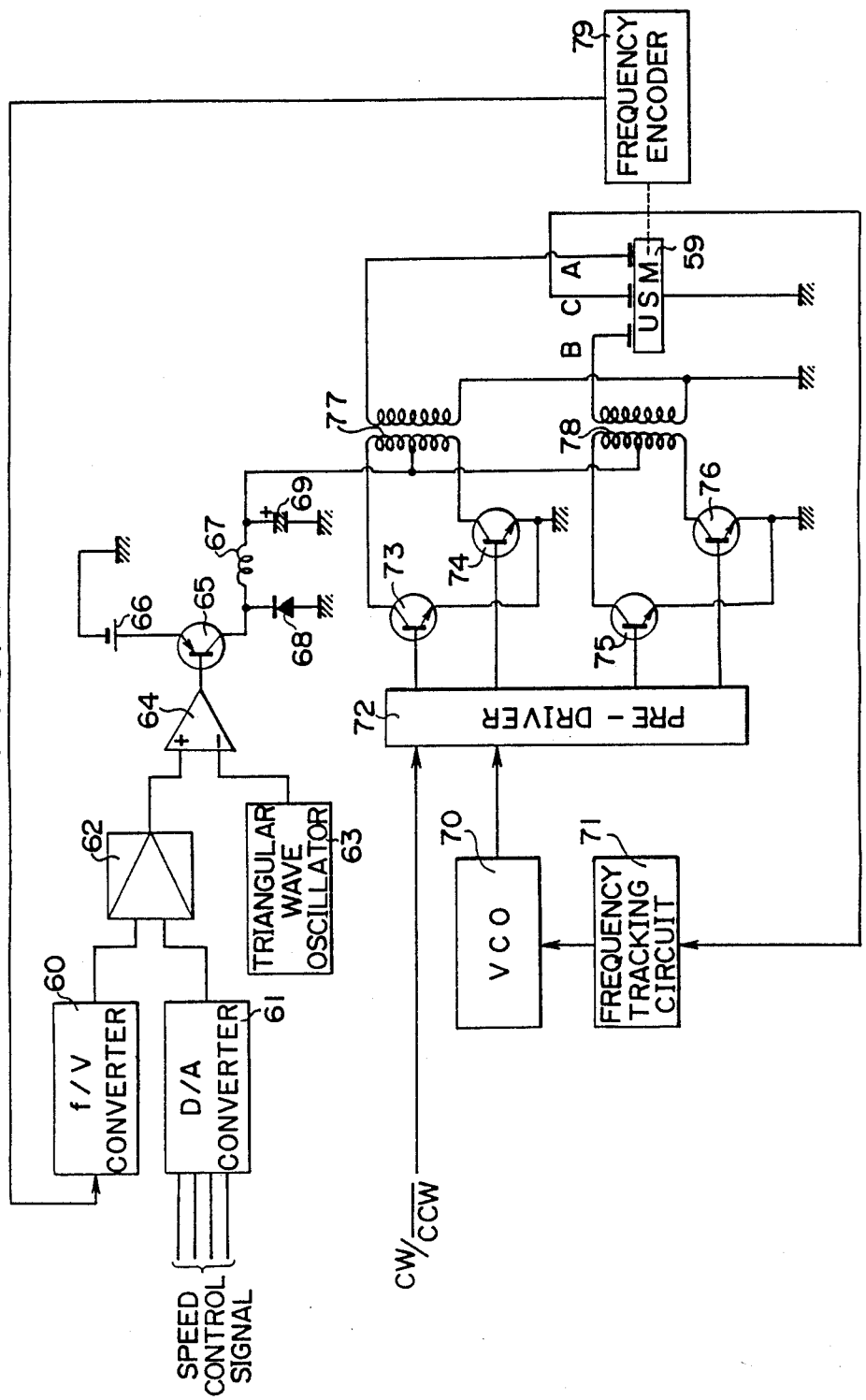
FIG. 8 is a circuit diagram of an ultrasonic motor control circuit shown in FIG. 7.

FIG. 8 is a circuit diagram of the USM control circuit 58 for USM 59. CPU 16 delivers a speed control signal in the form of a 4 bit, digital value, which is converted into an analog voltage by a D/A converter 61, and a resulting digital signal is fed to one input of a differential amplifier 62. On the other hand, the number of revolutions of USM 59 is detected by a frequency encoder 79, and its output is converted, by an f/v converter 60, into an analog voltage, which is fed to the other input of the amplifier 62. The amplifier 62 determines a difference between the two inputs or a speed error signal, which is fed to a comparator 64. The comparator 64 compares the error signal against a decision level, which is formed by an output from a triangular wave oscillator 63, thus delivering a pulse width modulation (PWM) output used to turn a transistor 65 on or off. A power source 66 (shown as a battery) feeds through the transistor 65 and a smoothing circuit including a choke coil 67, a diode 68 and a capacitor 69, a pair of transformers 77, 78 with a voltage which is proportional to the on/off ratio of the transistor 65. The purpose of the transformers 77, 78 is to step up the battery voltage to a level which is required by USM 59, with the step-up operation being controlled by a pre-driver 72 and transistors 73 to 76.

The pre-driver 72 distributes a pulse fed from a voltage controlled oscillator 70 to the transistors 73 to 76 so that alternating currents which are phase-shifted from each other by 90° are developed. The phase relationship is inverted depending on the direction signal also fed from CPU 16. When the alternating currents which are phase-shifted through 90° and which are stepped up by the transformers 77 and 78 are supplied to electrodes A and B of USM 59 at its resonant frequency, USM 59 rotates at the resonant frequency. The resonance of USM 59 is monitored by an electrode C, which feeds a frequency tracking circuit 71 functioning to control the oscillator 70 to provide an appropriate oscillation frequency. In this manner, USM 59 is controlled to rotate at a speed which corresponds to the speed control signal through the feedback loop mentioned above.

Figure 11:
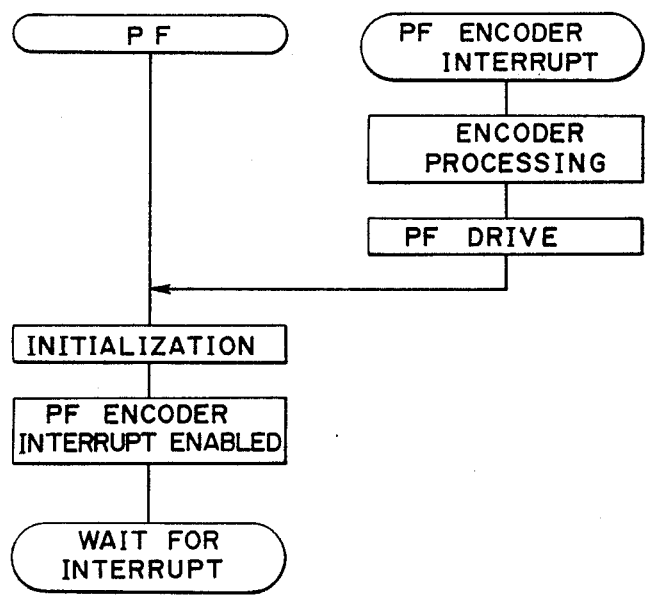
FIGS. 11 to 18 are flow charts illustrating a programmed operation of CPU used in the power focus apparatus of the above embodiment.

The operation of the power focussing apparatus according to the present embodiment will now be described with reference to flow charts shown in FIGS. 11 to 18. FIG. 11 shows a main routine or "PF" routine for the power focussing operation. After initialization, namely, clearing flags and counters and initializing input and output ports, an interrupt operation by the PF encoder is enabled and the apparatus enters a standby mode. In the present embodiment, three interrupt operations are enabled. First, when a photographer turns the rotary member 30a to cause the PF encoder rotation signal to be delivered, a "PF encoder interrupt" is enabled. Second, a "timer interrupt" is enabled for execution of a timing function for the power focussing operation. Third, a "pulse input interrupt" is enabled which is used to determine the amount of rotation of the motor.

Figure 12:
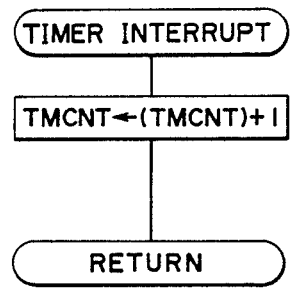
Figure 13:
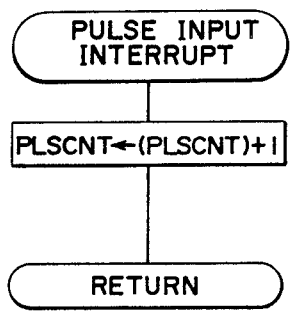

The "timer interrupt" occurs every 100 μS, enabling a timer counting operation to be performed during the power focussing operation. As shown in FIG. 12, every time this interrupt occurs, "1" is added to the content of a counter TMCNT, and the updated value may be read out any time desired, allowing the length of time which has passed to be determined. Referring to FIG. 13, the "pulse input interrupt" causes "1" to be added the content of a counter PLSCNT every time such interrupt occurs, thus allowing the number of motor rotation pulses to be counted.

Figure 14:
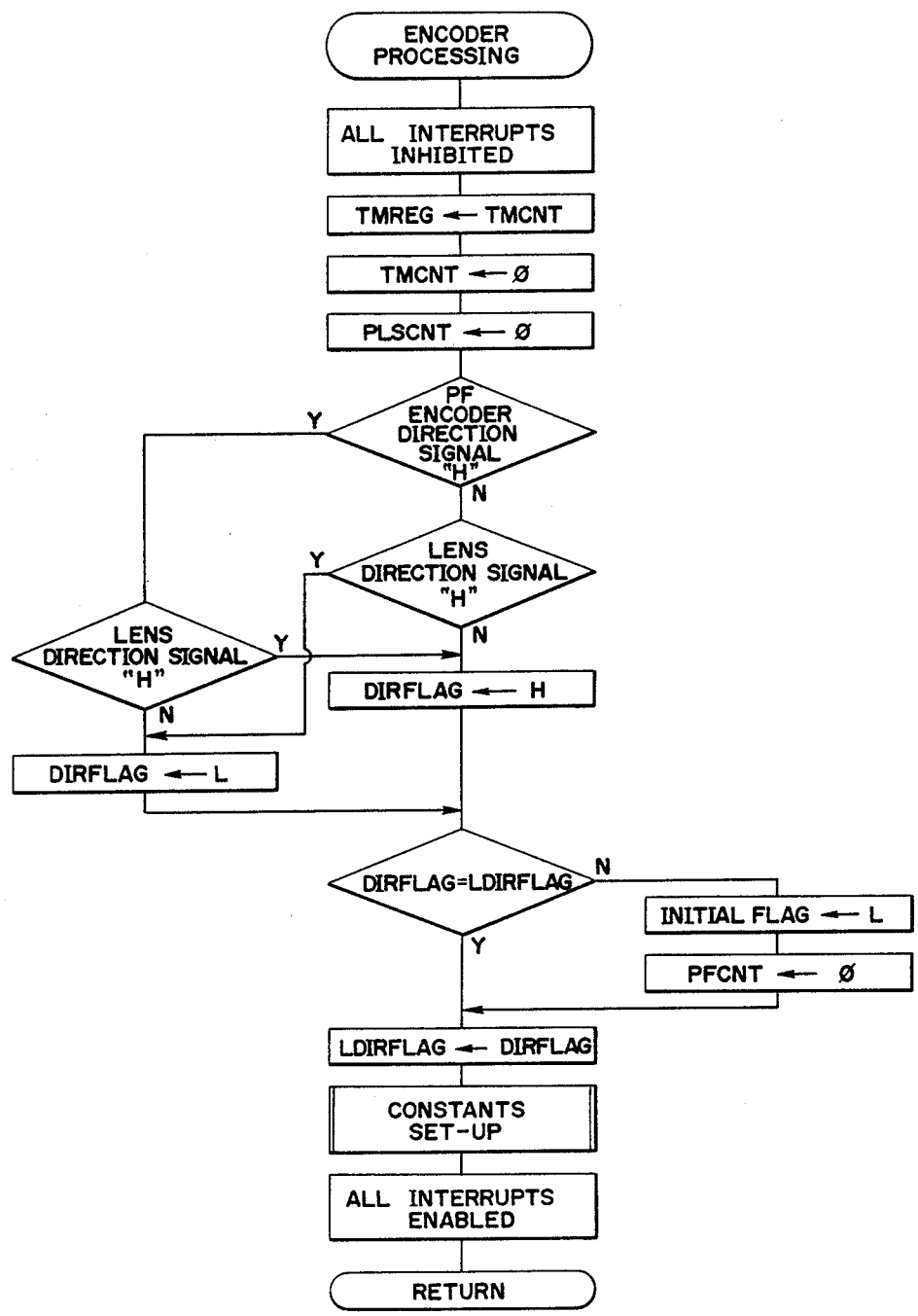

Suppose that a photographer operates the rotary member 30a and the "PF encoder interrupt" occurs. In the "PF encoder interrupt" routine, an "encoder processing" routine shown in FIG. 14 is initially called. In the "encoder processing" routine, all of the interrupts are initially inhibited, and after a content in the counter TMCNT is transferred into a register TMREG, both counters TMCNT and PLSCNT are cleared. The logical levels of the PF encoder direction signal and the lens direction signal are examined. As mentioned previously, the PF encoder direction signal assumes "H" level or "L" level if the rotary member 30a is operated clockwise (CW) or counter-clockwise (CCW), respectively. The lens direction signal represents the status of the switch 20 which is changed by the operating knob 37 on the lens barrel. The direction in which the motor 12 is driven is determined by a combination of these two signals, as indicated by Table 2 indicated below.

In this Table, DIR flag represents a flag which establishes the final direction of drive, and the motor 12 is driven for rotation in the forward or the reverse direction when the flag assumes "H" or "L" level, respectively.

TABLE 2

| PF encoder direction signal | lens direction signal | DIR flag |
| --- | --- | --- |
| H | H | H |
| H | L | L |
| L | H | L |
| L | L | H |

DIR flag is then compared against LDIR flag which stores a previous DIR flag. If they differ, the initial flag is cleared, and a counter PFCNT is reset to 0. DIR flag indicating the current direction of the motor drive is then transferred into LDIR flag. The purpose of clearing the initial flag and resetting the counter PFCNT is to return the driving condition to its initial condition upon occurrence of a sudden change in the direction of rotation of the PF encoder.

Figure 15:
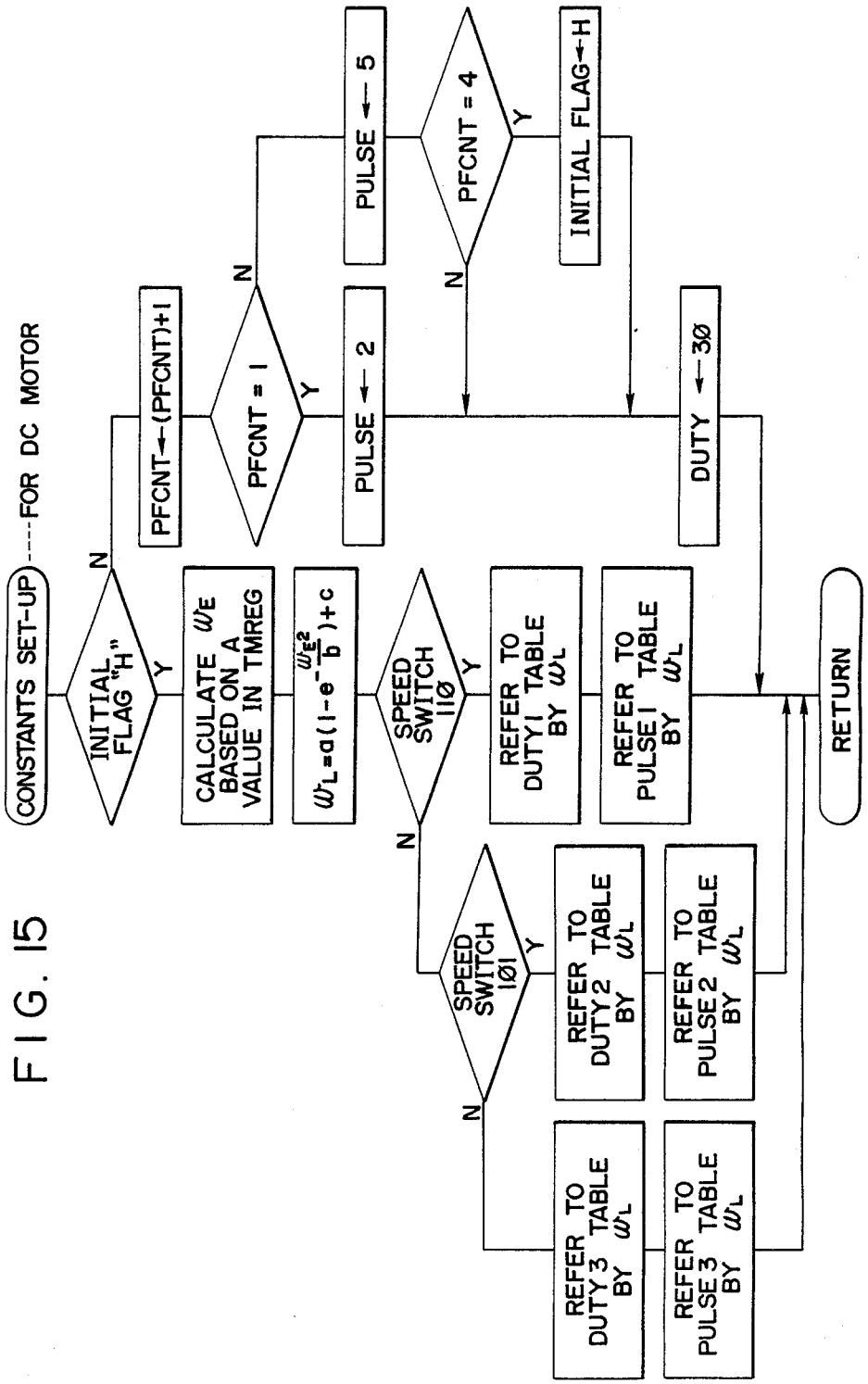

"Constants set-up" routine shown in FIG. 15 is then called. In this routine, the initial flag is examined initially. The initial flag indicates whether or not the current processing represents an initial operation. If this is the first operation, this flag assumes "L" level since it has been cleared at the beginning of the "PF" routine or when the direction of turning the rotary member 30a has changed. Accordingly, "1" is added to a content of the counter PFCNT, which as mentioned previously counts the number of encoder interrupts and which has been cleared at the beginning of the "PF" routine or when the direction of rotation of the rotary member 30a has changed. For the first operation, "2" is stored in a register PULSE and "30" is stored in a register DUTY, whereupon the program returns.

Returning to FIG. 14, upon exiting from the "constants set-up" routine, every interrupt is enabled to complete the "encoder processing" subroutine, whereby the program returns to the "PF encoder interrupt" routine shown in FIG. 11.

Figure 16:
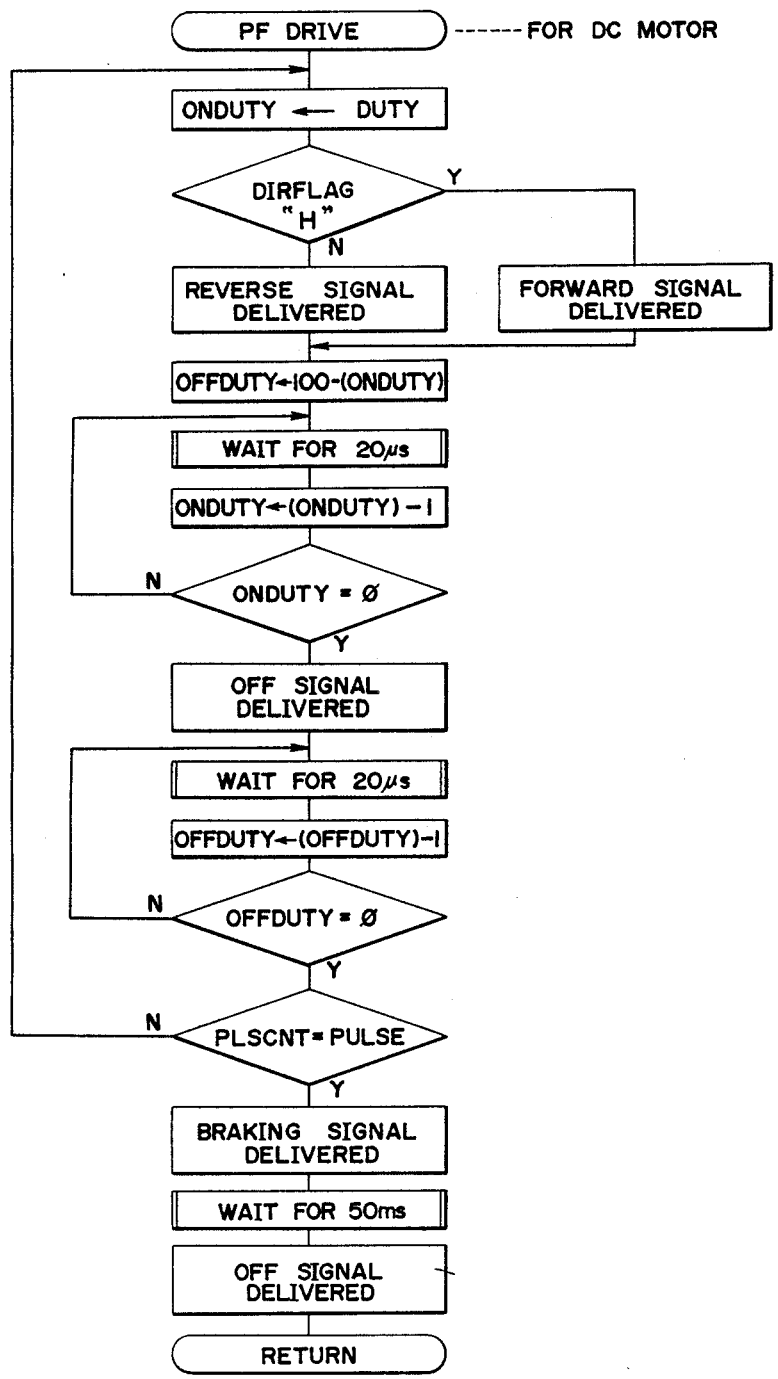
Figure 17:
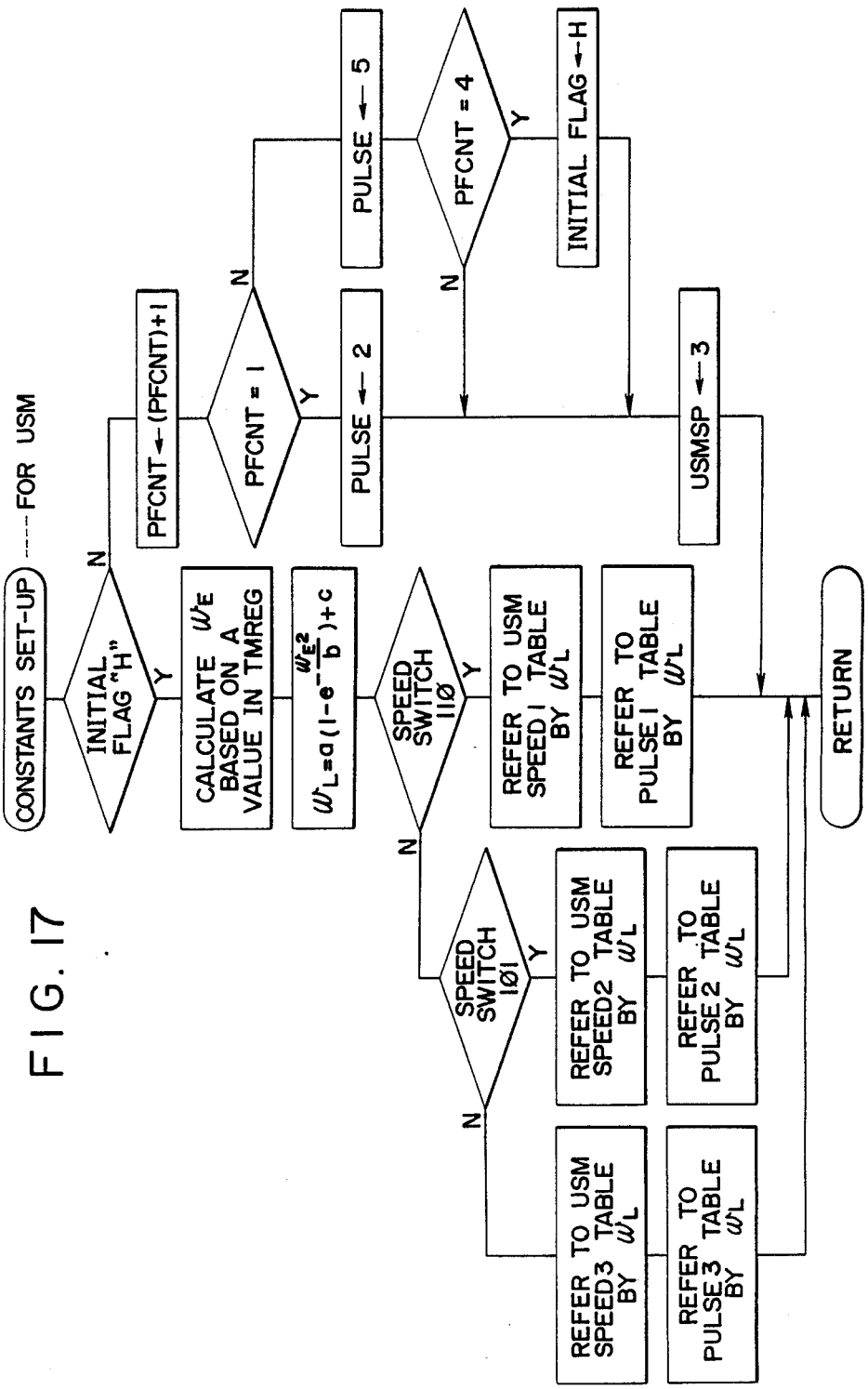

"PF drive" routine shown in FIG. 16 is then called. The actual power focussing drive is performed in this routine. It is to be understood that the "PF drive" routine shown in FIG. 16 corresponds to the use of DC motor 12, and a corresponding routine when USM 59 is used will be described later. The content of the register DUTY is initially transferred into a register ONDUTY, and then a forward rotation or a reverse rotation signal is delivered depending on the status of DIR flag. The motor then begins to rotate at this point in time, and then 100 from which the content of the register ONDUTY is subtracted is stored in a register OFFDUTY. This is because the power focussing operation by the DC motor 12 essentially comprises a pulse drive.

Since the content of the register ONDUTY is now equal to 30, it follows that 70 is stored in the register OFFDUTY. The ratio 30:70 represents a pulse drive ratio, meaning that the on/off ratio is equal to 30:70. As mentioned previously, a pulse drive on the order of 500 Hz (corresponding to one period of 2 ms) is appropriate, in the present embodiment, the motor 12 is allowed to be driven during a time interval corresponding to "the content of the register ONDUTY" multiplied by 20 $\mu$S while the motor 12 ceases to operate during a time interval corresponding to "the content of the register OFFDUTY" multiplied by 20 $\mu$S, thus performing a speed control of the motor 12. When the pulse drive with a duty cycle of 30% is continued, the motor 12 rotates at a low speed, and the detector 14 delivers a motor rotation pulse to CPU 16. The number of such pulses is counted by the counter PLSCNT during the "pulse input interrupt" routine. A decision is then made to see if the content of the counter PLSCNT coincides with the content of the register PULSE which now stores 2, and the pulse drive with the duty cycle of 30% is continued until such coincidence is reached. Upon coincidence, or when the motor 12 has rotated by two pulses, a braking signal is delivered, and the motor 12 is turned off after a time delay of 50 ms.

Referring to FIG. 9 to explain the above operation in terms of the timing chart, it will be noted that when the PF encoder rotation signal is supplied as shown at ①, the motor 12 is driven with a duty cycle of 30% in accordance with the PF encoder direction signal and the lens direction signal (not shown). When two motor rotation pulses are applied, the motor 12 is braked. In a motor speed diagram, a solid line represents a set-up speed while broken lines indicate an actual speed of the motor.

It is a feature of the invention that the speed with which the lens driving motor 12 is to be driven is determined by the rotational speed of the rotary member 30a. However, at least two PF encoder signals are required to determine the rotational speed. Accordingly, if the rotational speed is very slow, there is a certain length of time between the first and the second signal, during which the lens cannot be moved at all. To overcome such inconvenience, an operation scheme is adopted in which the motor is driven by two pulses with the duty cycle of 30% tentatively in response to the occurrence of the first "PF encoder interrupt". Accordingly, if the rotational speed is so fast that the next "PF encoder interrupt" occurs before the motor is driven by the two pulses, DUTY and PULSE are updated in accordance with the length of time between the first and the second occurrence. On the other hand, when the motor has been driven by two pulses, but the next following "PF encoder interrupt" does not occur after a time delay of 50 ms, the operation returns to the initial condition. In this manner, when the rotational speed is very low, the two pulse drive with the duty cycle of 30% is repeated in an interrupted manner.

Suppose now that the PF encoder rotation signal is supplied in succession. If a second "PF encoder interrupt" occurs during the time the "PF drive" routine is executed in response to the first occurrence of the "PF encoder interrupt", the "encoder processing" routine is called again. The "encoder processing" routine is executed in a similar manner as occurs in response to the first occurrence, and then "constants set-up" routine is called. Since the initial flag remains to be "L", during the "constants set-up" routine, "1" is added to the content of the counter PFCNT, which is then examined. Since the counter PFCNT then contains "2", "5" is now stored in the register PULSE. The content of the counter PFCNT is then examined again, but is found not to be equal to "4", and accordingly "30" is stored in the register DUTY. The program then returns. The pulse drive with the duty cycle of 30% is continued until the "PF encoder interrupt" occurs five times. Accordingly, the lens will be driven at a low speed until the PF encoder rotation signal occurs five times if the rotary member 30a is rapidly turned from its position corresponding to the stop. This facilitates a fine adjustment of the in-focus position, preventing a hunting therearound.

In the "constants set-up" routine, the initial flag is set when the counter PFCNT reaches "4", and accordingly when the fifth PF encoder rotation signal is supplied, the motor speed control which depends on the speed of turning the rotary member 30a is initiated.

Initially, the rotational speed $\omega_E$ of the rotary member 30a is calculated on the basis of a content in the register TMREG, which stores a pulse interval of the PF encoder rotation signal with a resolution of 100 μS (thus, 10 pulses for a pulse width of the 1 ms). Since its reciprocal represents rotational speed $\omega_E$, the latter can be utilized to determine the rotational speed $\omega_L$ of the motor according to the following formula:

$$\omega_L = a(1 - e^{-\frac{\omega_E^2}{b}}) + c$$

where a, b and c represent constants. Since three lens driving speeds are available according to a preference of a photographer in the arrangement of the invention, they can be chosen depending on the position of the changeover switch 38.

Assuming that the speed changeover switch 38 is positioned at Ⓛ, only the switch 17 (see FIG. 6) is turned on. Accordingly, a status signal I is equal to 110. DUTY 1 table is referred to with $\omega_L$, with a reference value being stored in the register DUTY. Similarly, when the switch 38 is positioned at Ⓜ, DUTY 2 table is referred to, and DUTY 3 table will be referred to when the switch is position at Ⓗ.

DUTY 1, DUTY 2 and DUTY 3 tables store the duty cycles with which the motor is to be driven in a manner corresponding to the rotational speed $\omega_L$ of the motor. They are related to each other for a given value of $f_L$ such that "(a reference value from DUTY 1 table)<(a reference value from DUTY 2 table)<(a reference value from DUTY 3 table)". In this manner, the lens driving speed is variable depending on the status of the switches 17 to 19 which is determined by the operating knob 38. Similarly, a number of pulses which are to be stored in the register PULSE is determined by referring to PULSE 1, PULSE 2 and PULSE 3 table. When DUTY and PULSE are determined in this manner, the program returns to execute the "PF drive" routine in a similar manner.

On the other hand, when a photographer ceases to turn the rotary member 30a, 31-st PF encoder rotation signal (indicated at ㉛) will be the last one, as viewed in the timing chart of FIG. 9. When this signal is delivered, the width $t_{30}$ between this signal and its preceding signal (shown at ㉚) determines the duty cycle of the pulse drive and a maximum number of pulses. Assuming that the maximum number of pulses is equal to five, the braking action is applied when the next following PF encoder rotation signal is absent after the lens has been driven by five pulses, whereby the program returns to its initial condition after waiting for a time interval of 50 ms.

When the direction in which the rotary member 30a is turned is rapidly changed, the PF encoder direction signal will be inverted at the same time as 19-th PF encoder rotation pulse (shown at ⑲) occurs, as viewed in the timing chart of FIG. 9, and accordingly the pulse drive with the duty cycle of 30% takes place from this time until 23-rd PF encoder rotation pulse (shown at ㉓) is supplied to drive the lens at a low speed, in a similar manner as occurs during the initial drive. This means that when the rotary member 30a is adjusted in opposite directions in a oscillatory manner around the in-focus position, the lens will be driven at a low speed independently of the rate at which the rotary member 30a is turned if the number of PF encoder rotation signals is within 4 pulses, thus preventing a hunting around the in-focus position and improving the focussing accuracy.

The above description has been directed to the operation of the power focussing apparatus employing a DC motor, but the operation of a power focussing apparatus employing USM 59 will now be described. The operation of the power focussing apparatus employing USM 59 differs from that of the power focussing apparatus employing the DC motor in respects of the "constants set-up" routine shown in FIG. 17 and the "PF drive" routine shown in FIG. 18.

When USM 59 is employed, the speed control takes place in accordance with a speed control signal which is delivered from CPU 16 to USM control circuit 58 as shown in FIG. 7, and the direction of drive is controlled by the direction signal. Accordingly, what must be determined in the "constants set-up" routine is 4-bit speed control data. During the initial drive when the drive occurs at a low speed, "3" is stored in a register USMSP rather than the register DUTY. When a reference to a table is made at times other than the initial drive, one of 16 levels of the speed is referred to and is stored in the register USMSP. In other respects, the operation occurs in a similar manner as when using the DC motor.

Figure 18:
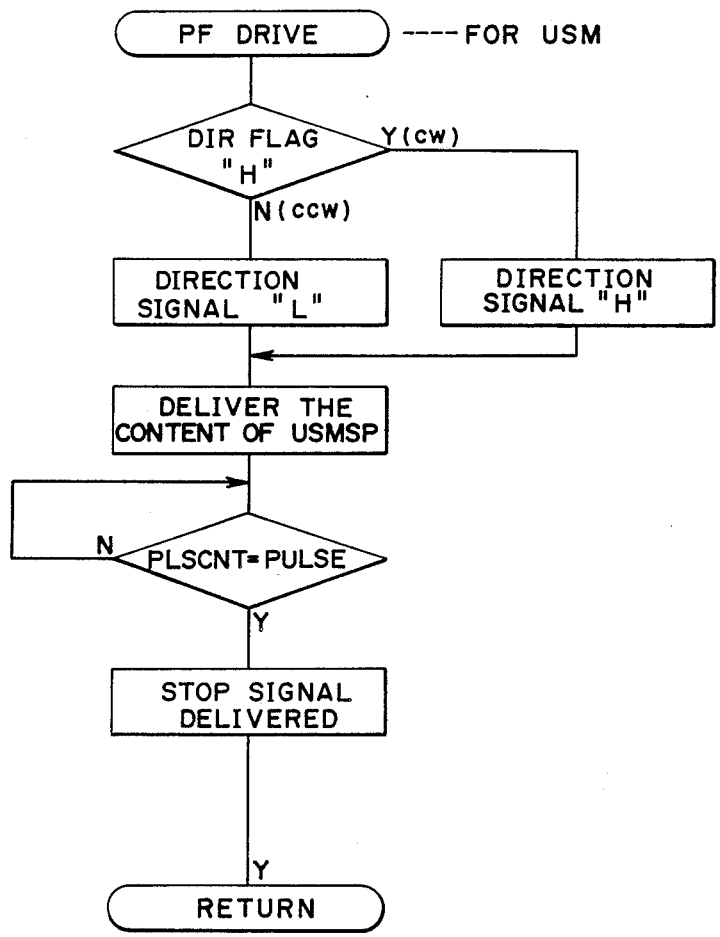

With respect to the "PF drive" routine, the direction signal is set in accordance with DIR flag, followed by delivering the content of the register USMSP as the speed control signal, as shown in FIG. 18. When the content in the register PLSCNT coincides with the content in the register PULSE, a stop signal is delivered. If the next following "PF encoder interrupt" occurs before the coincidence occurs, the interrupt operation is entered. Accordingly, there is no basic difference over the arrangement using the DC motor.

In the description given thus far, it has been assumed that the lens drive speed changeover switch is changed between three levels Ⓛ, Ⓜ and Ⓗ the described power focussing apparatus in order to simplify the description; but it should be understood that an increased number of levels may be utilized to facilitate the use of the apparatus of the invention.

What is claimed is:

1. A lens drive apparatus for driving the taking lens of a camera comprising:
   a manual operating member;
   a pulse generator for producing a pulse as the operating member is moved;
   means for detecting a speed of movement of the operating member on the basis of pulses produced by the pulse generator;
   a motor for driving a taking lens;
   output control means for delivering a drive signal to the motor in accordance with the speed of movement detected by the detecting means;
   and level preset means for modifying a relationship between a speed of movement and output drive signal delivered from the output control means, thereby allowing a level of the output drive signal to the motor which corresponds to a speed of movement of the operating member to be selectively chosen.

2. A lens drive apparatus according to claim 1 in which the speed detecting means detects one of the following conditions which include a frequency, a width of or an interval between pulses produced by the pulse generator and delivering a speed of movement signal to the output control means.

3. A lens drive apparatus according to claim 1 in which the output, control means includes a plurality of distinct table means which determine a relationship between the speed of movement and a corresponding drive signal, one of the tables being selected in accordance with an output from the level preset means.

4. A lens drive apparatus according to claim 1 in which the level preset means includes a lens drive speed changeover switch which is operated by the operating member for selecting a relationship between a speed of movement of the operating member and the speed with which the taking lens is driven.

5. A lens drive apparatus according to claim 1 in which the level preset means selects a relationship between a speed of movement of the operating member and the speed with which the lens is driven in accordance with a focal length of a taking lens.

6. A lens drive apparatus according to claim 1 in which the output control means determines a voltage to be applied to the motor in accordance with the speed of movement detected by the detecting means.

7. A lens drive apparatus according to claim 1 in which the output control means determines a frequency of the drive signal applied to the motor in accordance with the speed of movement detected by the detecting means.

8. A lens drive apparatus according to claim 1 in which the output control means determines a duty cycle with which the motor is to be energized in accordance with a speed of movement detected by the detecting means.

9. A lens driving apparatus for driving the taking lens of a camera comprising:
a manual operating member;
means for detecting a direction in which the operating member is moved;
a motor for driving said taking lens into an in-focus position;
direction control means responsive to the direction of movement detected by the detecting means to determine and to deliver an output representing a direction of a drive current to the motor;
and direction preset means for selectively presetting a relationship between the direction of movement determined by the control means and the direction of energization of the motor.

10. A lens drive apparatus according to claim 9 in which the pulse generator comprises means for generating a pair of phase-displaced signals and said direction detecting means delivers a direction signal by examining the phase relationship between a pair of pulse signals which are phase displaced from each other and which are produced by the pulse generator.

11. A lens drive apparatus according to claim 9 in which the direction preset means includes a lens drive direction changeover switch which is operated by a presetting member for selecting the relationship between the direction in which the operating member is operated and the direction in which the lens is driven.

12. A lens drive apparatus according to claim 1 or 9 in which the operating member comprises a manual operating ring which is mounted on a lens barrel in a movable manner or a manual operating knob which is disposed on a camera body in a movable manner.

13. A lens drive apparatus according to claim 1 or 9 in which the pulse generator comprises an encoder switch which is actuated by the operating member.

14. A lens drive apparatus according to claim 1 or 9 in which the motor drives the taking lens which changes the focal length of the taking lens.

15. A lens drive apparatus according to claim 1 or 9 in which the motor drives a lens which performs a focus adjustment of the taking lens.

16. A lens drive apparatus for driving the taking lens of a camera comprising:
a manual operating member;
means for detecting a speed of movement of the operating member;
means for detecting the direction in which the operating member is moved;
a motor for moving an optical system of a the taking lens;
calculation means for determining a drive output applied to the motor in accordance with an output from the speed detecting means and an output from the direction detecting means;
and means for changing an output from the calculation means.

17. A method for driving the taking lens of a camera having a manual operating member movable in opposing directions to select the speed of movement of the taking lens and including means for generating a pair of phase-displaced pulses which occur at a rate dependent upon the rate of movement of said manual operating member, comprising the steps of:
examining said pulses to determine the speed of movement of the operating member;
examining the phase relationship between said pulses to determine the direction of movement of said manual operating member;
calculating a drive output signal to be applied to the taking lens drive motor responsive to the pulse rate and phase relationships which have been detected; and
selectively changing the calculated value responsive to the state of the speed selection member.

18. A method for driving the taking lens of a camera having a manual operating member movable in opposing directions to select the direction of movement of the taking lens and including means for generating a pair of phase-displaced pulses which occur at a rate dependent upon the rate of movement of said manual operating member, comprising the steps of:
examining said pulses to determine the speed of movement of the operating member;
examining the phase relationship between said pulses to determine the direction of movement of said manual operating member;
calculating a drive output signal to be applied to the taking lens drive motor responsive to the pulse rate and phase relationships which have been detected; and
changing the direction of rotation of the taking lens responsive to the state of the direction selection member.

* * * * *

UNITED STATES PATENT AND TRADEMARK OFFICE
CERTIFICATE OF CORRECTION

PATENT NO.  :   4,896,179
DATED       :   January 23, 1990
INVENTOR(S) :   Watanabe et al.

It is certified that error appears in the above-identified patent and that said Letters Patent is hereby corrected as shown below:

Column 1, line 67, "camera a" should be --a camera--

Column 2, line 11, after "operated." delete "dr"

Column 2, line 16, "to" should be --two--

Column 4, line 13, "tee" should be --the--

Column 4, line 25, "low" should be --Icw--

Column 5, line 34, "estabilished" should be --established--

Column 9, line 36, " $\int L$" should be -- $\omega_L$--

Column 10, line 60, "a" (second occurrence) should be --said--

Signed and Sealed this

Twentieth Day of August, 1991

Attest:

HARRY F. MANBECK, JR.

Attesting Officer

Commissioner of Patents and Trademarks